United States Patent [19]
Terada et al.

[11] Patent Number: 5,201,912
[45] Date of Patent: Apr. 13, 1993

[54] BUMPER APPARATUS FOR AUTOMOBILE

[75] Inventors: Haruhiko Terada, Obu; Shinichi Haneda, Hoi; Masataka Ohashi, Nagoya; Kiyohito Gyobu, Imizu; Kazunari Azuchi, Himi, all of Japan

[73] Assignees: Aisin Seiki Kabushiki Kaisha; Aisin Keikinzoku Kabushiki Kaisha, Japan

[21] Appl. No.: 851,686

[22] Filed: Mar. 12, 1992

[30] Foreign Application Priority Data

Mar. 29, 1991 [JP] Japan ................. 3-066611

[51] Int. Cl.⁵ .............................. B60R 19/06
[52] U.S. Cl. ................... 293/120; 293/132; 293/133; 293/136
[58] Field of Search ............. 293/120, 121, 122, 102, 293/133, 132; 188/371, 372, 376, 377

[56] References Cited

U.S. PATENT DOCUMENTS

| | | | |
|---|---|---|---|
| 4,431,221 | 2/1984 | Jahnle | 293/122 |
| 4,460,206 | 7/1984 | Peter | 293/120 |
| 4,829,979 | 5/1989 | Moir | 293/133 |
| 4,971,376 | 11/1990 | Eipper et al. | 293/120 |
| 5,116,092 | 5/1992 | Schönleber | 293/132 |

FOREIGN PATENT DOCUMENTS 2-175452  7/1990  Japan.
884953  12/1961  United Kingdom .............. 293/133

Primary Examiner—Robert R. Song
Attorney, Agent, or Firm—Finnegan, Henderson, Farabow, Garrett & Dunner

[57] ABSTRACT

An energy absorbing member (12) is installed in a bumper reinforcement (4) so that one end of the energy absorbing member (12) faces the side member (3) of an automobile. During an accident, if a force is applied to the bumper apparatus (2), the energy absorbing member (12) collapses like a bellows in order to absorb this shock. The energy absorbing member (12) will reliably collapse in this desired manner under many conditions, for example, where the automobile is large and heavy or where the accident occurs under a high-speed condition. The energy absorbing member (12) is of a tubular shape with smooth and straight surfaces so that the energy absorbing member (12) can be easily produced by an extraction forming method or the like. Furthermore, the energy absorbing member (12) is installed within the bumper reinforcement (14) so that the bumper apparatus (2) projects less from an automobile body (1) in comparison to conventional bumpers.

10 Claims, 5 Drawing Sheets

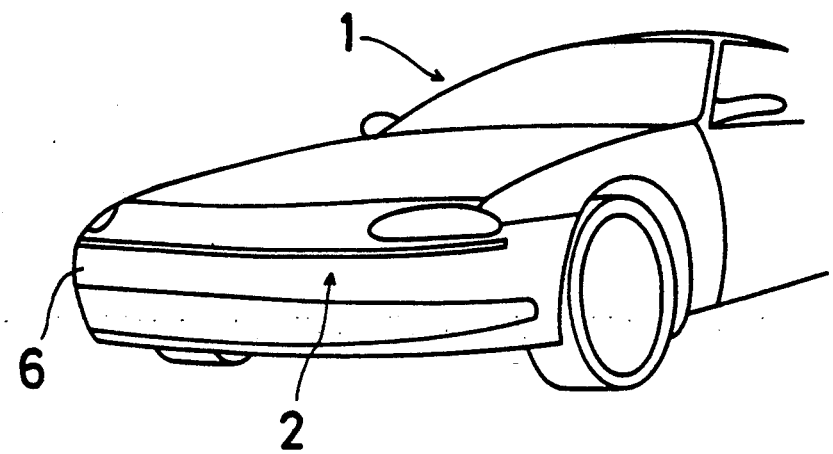
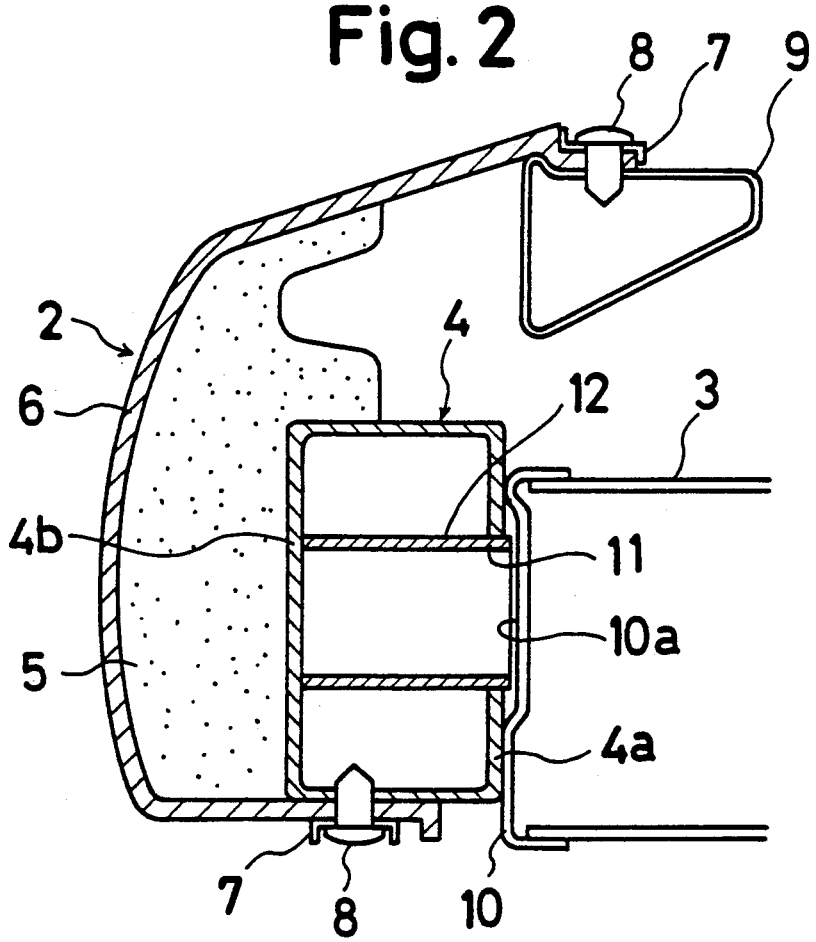

BUMPER APPARATUS FOR AUTOMOBILE

FIELD OF THE INVENTION

This invention relates to a bumper apparatus which is provided on the front and rear ends of an automobile for absorbing shock incurred in an accident.

DESCRIPTION OF THE RELATED ART

Japanese laid-open patent publication No. 2-175452 published on Jul. 6, 1990 discloses a conventional bumper apparatus. In the conventional bumper apparatus, an energy absorbing member is made of a hollow rectangular tube which has series of beads. The energy absorbing member is installed between a bumper apparatus and a side member of an automobile. The energy absorbing member collapses like a bellows in response to impact. The energy absorbing member collapses desirably and reliably under various conditions, for example, when the automobile is heavy or under high speed impact. Accordingly, the energy absorbing member absorbs well the impacting force between the bumper apparatus and the side member.

However, in the conventional apparatus, a series of beads are necessary for the energy absorbing member in order to obtain desirable and reliable collapse of the energy absorbing member. To make this series of heads for the energy absorbing member may be expensive. Further, the energy absorbing member forces the bumper apparatus to project from the side member since the energy absorbing member is provided between the bumper apparatus and the side member. Therefore, the bumper apparatus may project too far out from the automobile body and be contrary to the recent design of automobiles where the bumper apparatus does not project from the automobile body to such an extent.

SUMMARY OF THE INVENTION

Accordingly, one of the objects of this invention is to produce an inexpensive and good bumper apparatus.

Further, one of the objects of this invention is to provide a bumper apparatus which can be used in heavy automobiles.

Furthermore, one of the objects of this invention is to provide a bumper apparatus which can be used with high speed automobiles.

Another of the objects of this invention is to reduce the extent to which the bumper apparatus projects from the automobile body.

To achieve the above described objects, the bumper apparatus of the present invention has an energy absorbing member which has a smooth and straight surface and is installed in a bumper reinforcement with one end of the energy absorbing member facing the side member of an automobile.

When an accident effects a shock to the automobile bumper apparatus, the energy absorbing member collapses like a bellows in order to absorb this shock. Thus, the energy absorbing member collapses in a desirable and reliable manner under many situations of automobile, for example, where the automobile is heavy or where impact occurs under a high speed situation. Further, the energy absorbing member has a tubular shape having a smooth and even surface so that the energy absorbing member can be easily produced by extraction forming method or by other proper method. Furthermore, the energy absorbing member is installed in the bumper reinforcement so that the bumper apparatus projects less from an automobile body.

Other objects and features will be apparent from following description and attached drawings.

BRIEF DESCRIPTION OF THE DRAWINGS

FIG. 1 is a perspective view of an automobile on which is mounted a bumper apparatus of this invention.

FIG. 2 is a cross sectional view of a bumper apparatus of this invention.

DETAILED DESCRIPTION OF PREFERRED EMBODIMENTS

Figure 3:
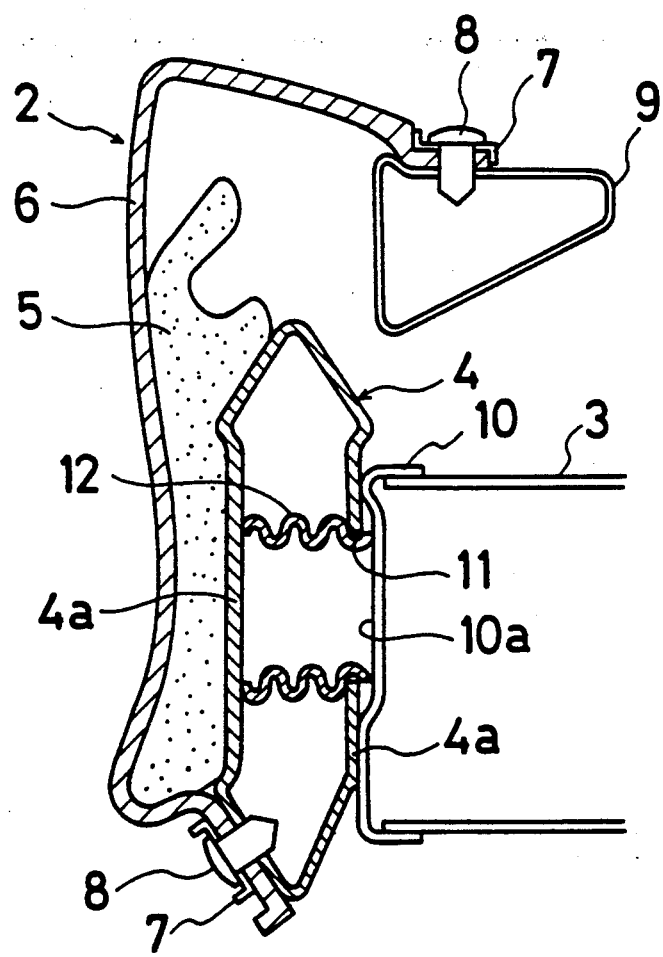
FIG. 3 is a cross sectional view of a bumper apparatus of this invention after absorbing the shock created in an accident.

As shown in FIG. 1, a bumper apparatus (2) is mounted at the front of an automobile body (1).

As shown in FIG. 2, a pair of side members (3) (only one is shown) is mounted to both front sides of the automobile body (1). A bumper reinforcement (4) is secured to the side members (3) by screws (not shown). The bumper reinforcement (4) has a hollow and rectangular cross-section and extends laterally across the automobile body (1). The bumper reinforcement (4) is made through aluminum alloy extracting forming method. An absorber (5) is provided in front of the bumper reinforcement (4). The absorber (5) is made of urethane foam. The bumper reinforcement (4) and the absorber (5) are covered with a bumper cover (6) which is made of rosin and becomes an exterior component of the automobile body (1). The upper and lower ends of the bumper cover (6) are secured to a cover support member (9) and the bumper reinforcement (4) by brackets (7) and clips (8), respectively.

A side bracket (10) is fixed to a front end of the side member (3). The side bracket (10) provides a flat surface (10a). An opening (11) is formed in the bumper reinforcement at a portion where the rear (4a) of the bumper reinforcement (4) faces the flat surface (10a). In the opening (11) of bumper reinforcement (4), an energy absorbing member (12) is installed. One end of the energy absorbing member (12) extends to the flat surface (10a) through the opening (11). The other end of the energy absorbing member (12) extends to the front side (4b) of the bumper reinforcement (4). The energy absorbing member (12) is made of a light weight substance having a small Young's modulus, which is, for example, light alloy or fiber reinforced plastics. The energy absorbing member (12) has a tubular shape having a smooth and even surface. The energy absorbing member (12) is welded to the opening (11) or is pressed into the opening (11) in order to fix the energy absorbing member (12) to the bumper reinforcement (4).

As shown in FIG. 3, when a shock caused by an accident affects the bumper apparatus (2), the bumper cover (6) is deformed and pressure is applied to the absorber (5). At the same time, the bumper reinforcement (4) and the energy absorbing member (12) collapse in order to absorb the accidental shock. The energy absorbing member (12) collapses like a bellows.

Figure 4:
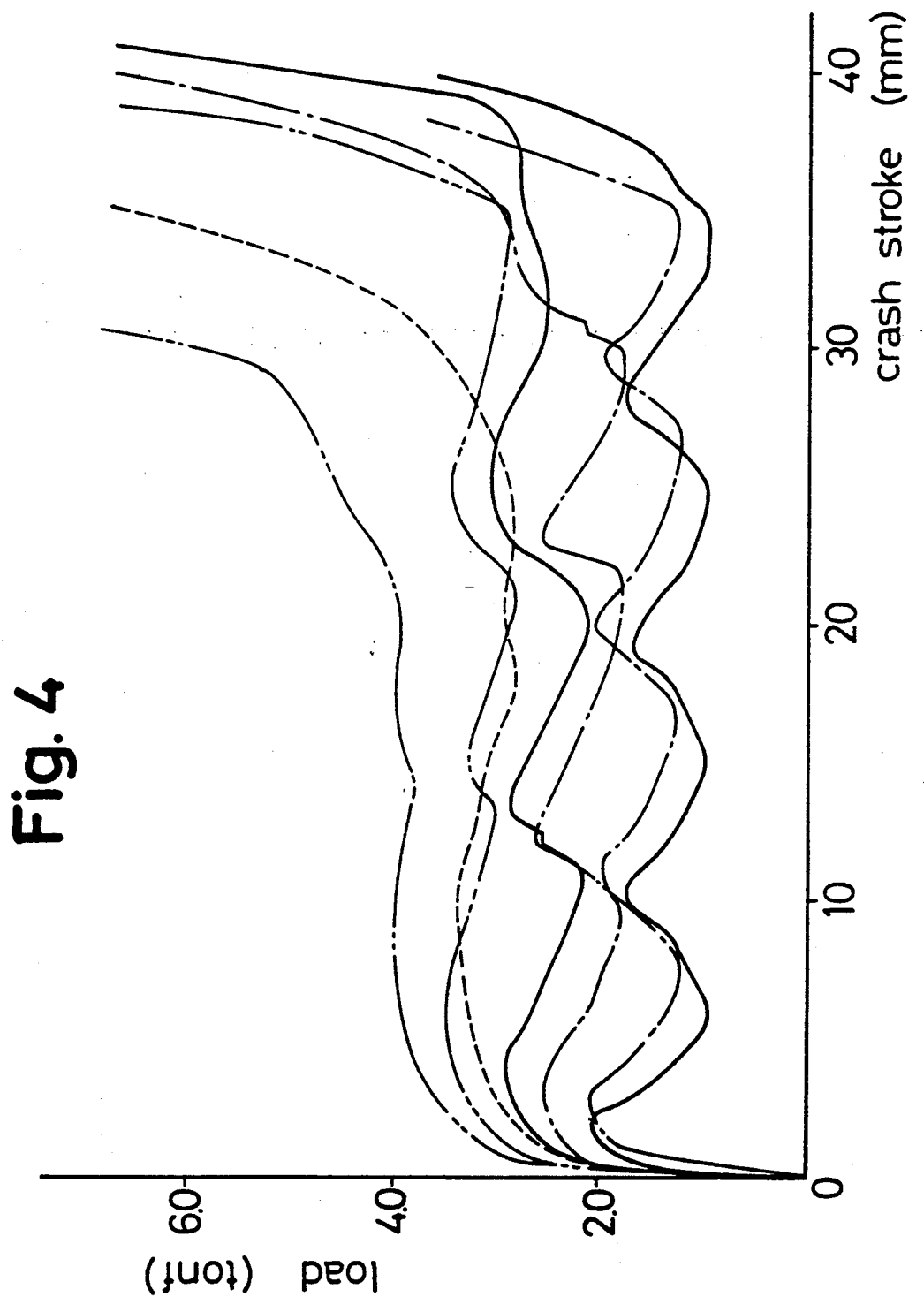
FIG. 4 is a graph showing collapsing features of a bumper apparatus of this invention.

As shown in FIG. 4, the energy absorbing member (12) shows desirable and reliable crash features along a long crash stroke under high crash load. Therefore, the energy absorbing member (12) absorbs well the energy in either the high weight case or the high speed case. Further, the energy absorbing member (12) has a tubular shape with a smooth and even surface. Therefore, the energy absorbing member (12) can be easily and cheaply produced by extracting forming method. Furthermore, the energy absorbing member (12) is made from a light weight substance. Therefore, the bumper apparatus (2) can be light in weight. Because the energy absorbing member (12) is installed in the bumper reinforcement (4) the bumper apparatus (2) projects a reduced amount from the side member (3). Thus, the external design of the automobile can be determined in a flexible manner. Meanwhile, the crash features shown in FIG. 4 are adjustable for any automobile by changing the thickness of the energy absorbing member (12), by selecting the proper material or by other manner.

Figure 5:
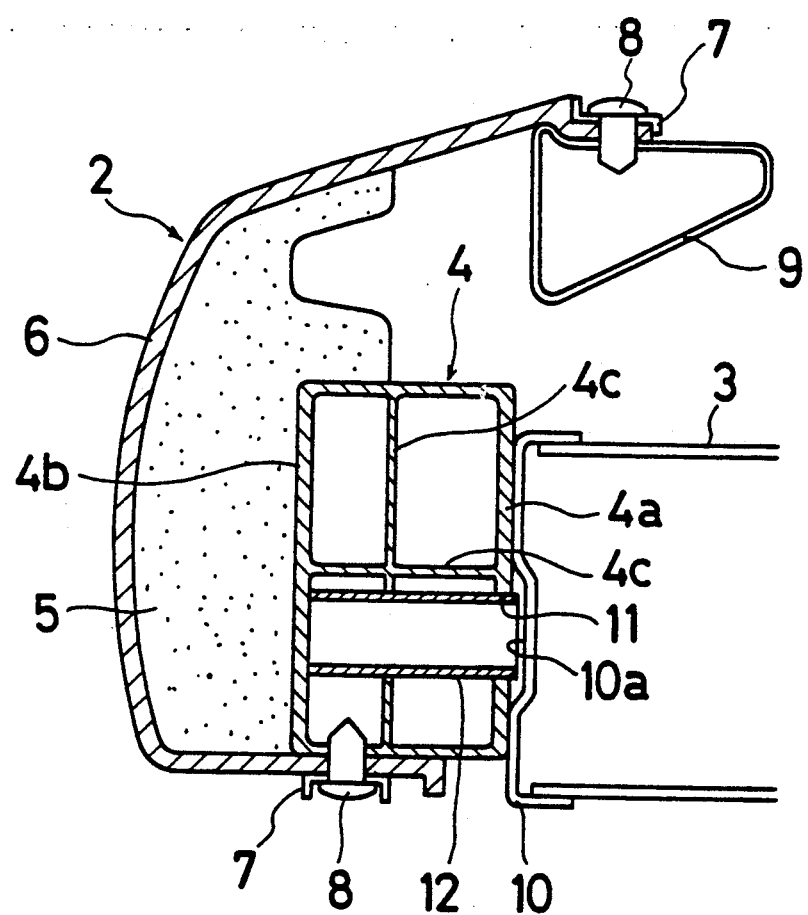
FIG. 5 is a cross sectional view of the second embodiment of this invention.
Figure 6:
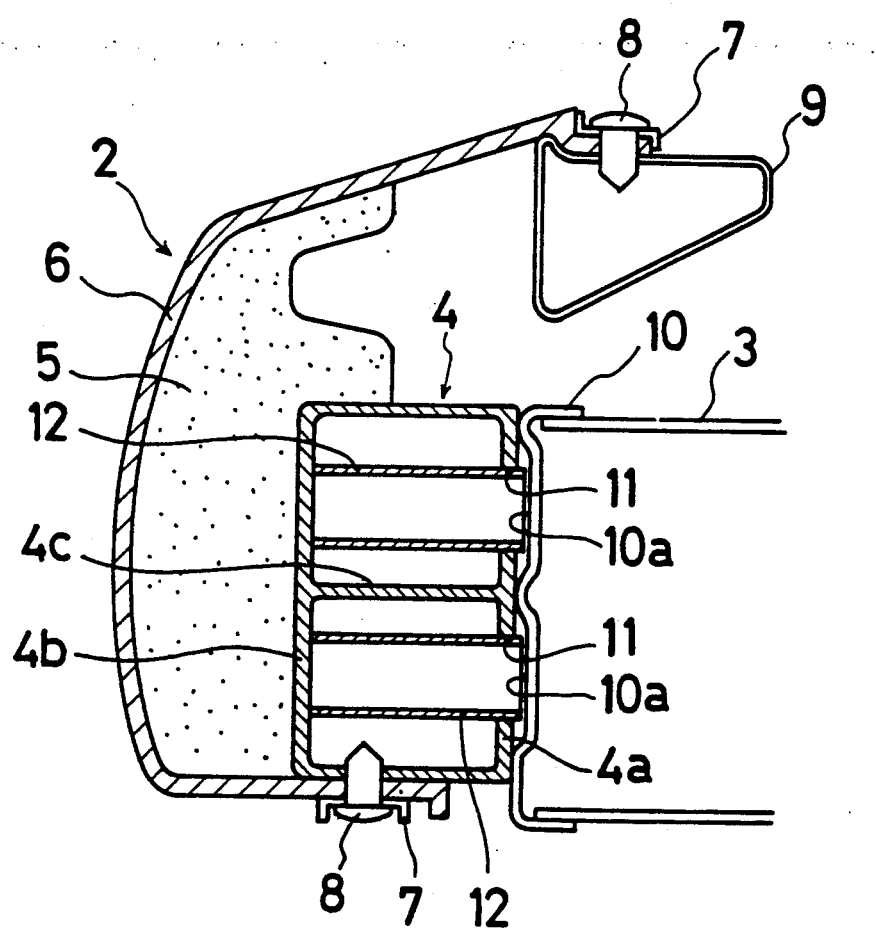
FIG. 6 is a cross sectional view of the third embodiment of this invention.

As shown in the embodiment of FIG. 5, the energy absorbing member (12) can be adapted to fit in the bumper reinforcement (4) which has a rib (4c). Further, as shown in the embodiment of FIG. 6, plural energy absorbing members (12) can be provided in the bumper reinforcement (4).

It should now be apparent that modifications may be made without departing from the spirit or scope of this invention.

What is claimed is:

1. A bumper apparatus for use in an automotive vehicle in which the vehicle has a pair of laterally spaced side members positioned at the front end of the vehicle body, comprising:
   a bumper reinforcement extending in a direction laterally of the vehicle and having a rectangular configuration in cross-section, including a rear side for being secured to the side members, a front side spaced from the rear side, and upper and lower sides connecting the rear and front sides;
   a pair of tubular energy absorbing members, each of which is mounted within the bumper reinforcement and supported at said rear side, and each tubular member extending in a longitudinal direction from the front side to the rear side;
   a support member positioned above the side members at the front end portion of the vehicle body;
   a cover member having an upper end connected to the support member and a lower end connected to the lower side of the bumper reinforcement; and
   an urethane absorber disposed within the cover member adjacent the front side of the bumper reinforcement.

2. A bumper apparatus according to claim 1, wherein each tubular energy absorbing member abuts the front side of the bumper reinforcement.

3. A bumper apparatus according to claim 1, wherein the urethane absorber extends outwardly from the front side and onto the upper side of the bumper reinforcement.

4. A bumper apparatus according to claim 2 wherein the tubular energy absorbing members are formed of a light alloy.

5. A bumper apparatus according to claim 2 wherein the tubular energy absorbing members are formed of a fiber reinforced plastic.

6. A bumper apparatus for use in an automotive vehicle in which the vehicle has a pair of laterally spaced side members positioned at the front end portion of the vehicle body, comprising:
   a bumper reinforcement extending in a direction laterally of the vehicle and having a rectangular configuration in cross-section, including a rear side for being secured to the side members, a front side spaced from the rear side, and upper sides connecting the rear and front sides, a vertical rib connected to the upper side and the lower side and extending in parallel with the rear side, and a horizontal rib connected to the rear side and the front side and extending in parallel with the upper side;
   a pair of tubular energy absorbing members, each of which is mounted within the bumper reinforcement in parallel with the horizontal rib and supported by said rear side;
   a support member positioned above the bumper reinforcement at the front end portion of the vehicle body;
   a cover member having an upper end connected to the support member, and a lower end connected to the lower side of the bumper reinforcement; and
   an urethane absorber disposed within the cover member adjacent the front side of the bumper reinforcement.

7. A bumper apparatus according to claim 6 wherein each tubular energy absorbing member abuts the front side of the bumper reinforcement.

8. A bumper apparatus according to claim 6 wherein the urethane absorber extends outwardly from the front side and onto the upper side of the bumper reinforcement.

9. A bumper apparatus according to claim 7 wherein the tubular energy absorbing members are formed of a light alloy.

10. A bumper apparatus according to claim 7 wherein the tubular energy absorbing members are formed of a fiber reinforced plastic.

* * * * *